United States Patent
Aikawa et al.

(10) Patent No.: US 6,909,574 B2
(45) Date of Patent: Jun. 21, 2005

(54) DISK DEVICE CONDUCTING A DISTURBANCE COMPENSATION BASED ON A TIME-INTERVAL MEASUREMENT IN READING SERVO SECTORS RECORDED ON A DISK

(75) Inventors: Koichi Aikawa, Kawasaki (JP); Tatsuro Sasamoto, Kawasaki (JP); Akihide Jinzenji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 697 days.

(21) Appl. No.: 09/880,193

(22) Filed: Jun. 13, 2001

(65) Prior Publication Data

US 2002/0109932 A1 Aug. 15, 2002

(30) Foreign Application Priority Data

Feb. 15, 2001 (JP) ........................................ 2001-039249

(51) Int. Cl.[7] .............................................. G11B 5/596
(52) U.S. Cl. .................................................... 360/77.04
(58) Field of Search .......................... 360/77.04, 77.08, 360/75, 77.03, 78.06, 78.09, 97.03, 77.01, 77.02, 77.05, 77.06; 369/44.28, 44.29

(56) References Cited

U.S. PATENT DOCUMENTS

| 4,947,093 A | 8/1990 | Dunstan et al. ............. 318/560 |
| 5,196,970 A | 3/1993 | Seko et al. ............... 360/77.03 |
| 5,306,994 A | 4/1994 | Supino ....................... 318/561 |
| 5,402,400 A | 3/1995 | Hamada et al. ........... 360/78.06 |
| 5,404,253 A | 4/1995 | Painter ..................... 360/77.04 |
| 5,426,545 A | 6/1995 | Sidman et al. ........... 360/78.09 |
| 5,481,641 A | 1/1996 | Nakamura et al. .......... 388/800 |
| 5,663,847 A | 9/1997 | Abramovitch |
| 5,757,747 A | 5/1998 | Shimada ................... 369/44.28 |
| 5,818,651 A | 10/1998 | Nomura ................... 360/78.06 |
| 5,970,033 A | 10/1999 | Nakano et al. .......... 369/44.29 |
| 5,986,845 A | 11/1999 | Yamaguchi et al. .......... 360/75 |
| 6,023,390 A | 2/2000 | Kang ....................... 360/77.04 |
| 6,163,429 A | 12/2000 | Tousain et al. .......... 360/77.04 |
| 6,421,200 B2 * | 7/2002 | Takaishi .................. 360/78.09 |
| 6,469,863 B1 * | 10/2002 | Ell .......................... 360/78.04 |
| 6,492,926 B2 * | 12/2002 | Pasolini et al. ............. 341/143 |
| 6,597,532 B1 * | 7/2003 | Usui et al. ............... 360/97.03 |
| 6,628,579 B2 * | 9/2003 | Watanabe et al. ......... 369/44.28 |
| 6,674,600 B1 * | 1/2004 | Codilian et al. ............... 360/75 |
| 6,678,108 B2 * | 1/2004 | Smith et al. ............. 360/77.04 |
| 6,684,114 B1 * | 1/2004 | Erickson et al. .............. 700/45 |

FOREIGN PATENT DOCUMENTS

| JP | 05120817 A | 5/1993 |
| JP | 8-329633 | 12/1996 |
| JP | 10021571 A | 1/1998 |

\* cited by examiner

*Primary Examiner*—David Hudspeth
*Assistant Examiner*—Fred F. Tzeng
(74) *Attorney, Agent, or Firm*—Greer, Burns & Crain, Ltd.

(57) ABSTRACT

A disk device comprises a disk having predetermined information sectors recorded at a constant interval; a head scanning the disk; and a disturbance-compensation unit obtaining an amount of a disturbance based on a time-interval measurement in reading the predetermined information sectors so as to compensate a position of the head according to the amount of the disturbance.

20 Claims, 11 Drawing Sheets

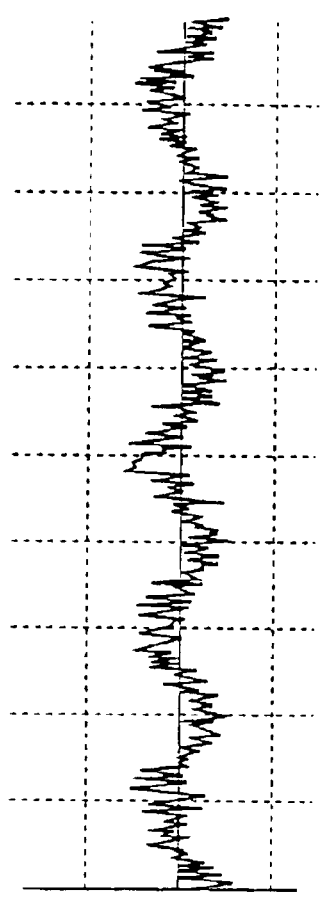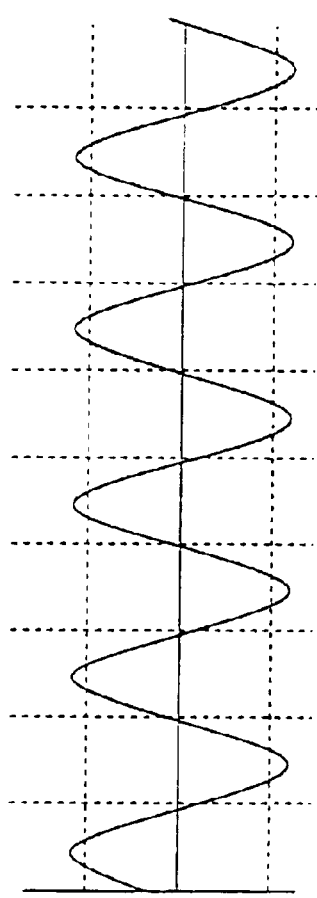
FIG. 10A  FLUCTUATIONS OF A SERVO-SECTOR INTERVAL TIME (51.2ns/div)
FIG. 10B  ROTARY EXCITATION (50rad/s²/div)
Time (5ms/div)

DISK DEVICE CONDUCTING A DISTURBANCE COMPENSATION BASED ON A TIME-INTERVAL MEASUREMENT IN READING SERVO SECTORS RECORDED ON A DISK

BACKGROUND OF THE INVENTION

1. Field of the Invention

The present invention generally relates to a disk device and a method of compensating a disturbance in the disk device and, more particularly, to a disk device positioning a head by a rotary actuator and a method of compensating a disturbance in the disk device.

In a magnetic disk device, a rotary actuator is generally used as a mechanism to move and position a head. The rotary actuator is greatly affected by a rotative disturbance due to a structure thereof.

Thus, there is proposed a measure for compensating an influence of such a disturbance to a positioning of a head. The measure comprises mounting an acceleration sensor on a body or a circuit board of a magnetic disk device, sensing an external vibration and a vibration caused by a seek reaction-force of the magnetic disk device itself, and controlling a disturbance compensation by using information detected so as to prevent the vibrations from affecting a positioning of a head.

2. Description of the Related Art

First, a description will be given of a structure of a magnetic disk device.

FIG. 1 is an illustration of a structure of a conventional magnetic disk device. FIG. 2 is a block diagram of the conventional magnetic disk device.

A magnetic disk device 100 comprises a disk enclosure 110 and a printed circuit board 120. The disk enclosure 110 incorporates a magnetic disk 111, a spindle motor 112, a magnetic head 113, an arm 114, and a voice coil motor (VCM) 115. The spindle motor 112 is driven by a driving signal from the printed circuit board 120 so as to rotate the magnetic disk 111 at a constant speed in directions indicated by an arrow A. The voice coil motor 115 is driven by a driving signal from the printed circuit board 120 so as to oscillate the arm 114 in directions indicated by an arrow B. The magnetic head 113 is moved in a radial direction together with the arm 114 being oscillated in the directions indicated by the arrow B.

A signal read by the magnetic head 113 is supplied to a head IC 116. The head IC 116 amplifies the signal from the magnetic head 113. The head IC 116 also amplifies a signal to be recorded on the magnetic disk 111, and supplies the amplified signal to the magnetic head 113.

The signal supplied from the magnetic head 113 and amplified by the head IC 116 is supplied to the printed circuit board 120. The printed circuit board 120 comprises a hard disk controller (HDC) 121, a RAM 122, a ROM 123, an MPU 124, a read channel (RDC) 125, a servo controller (SVC) 126, and linear acceleration sensors 127 and 128.

The information (signal) read by the magnetic head 113 and amplified by the head IC 116 is decoded by the read channel 125 and the hard disk controller (HDC) 121, and then is supplied to a higher system 130.

On the other hand, information from the higher system 130 is supplied to the hard disk controller (HDC) 121 and the read channel 125, and is decoded thereby. The decoded information is supplied to the head IC 116, and is amplified thereby. The amplified signal is supplied to the magnetic head 113, and is recorded on the magnetic disk 111.

Next, a description will be given of the printed circuit board compensating a rotative disturbance of the conventional magnetic disk device.

FIG. 3 is a plan view of the conventional printed circuit board as an example. The conventional magnetic disk device 100 has the two acceleration sensors 127 and 128 mounted on the printed circuit board 120, and conducts a disturbance compensation by calculating an angular acceleration α from outputs G1 and G2 of the two acceleration sensors 127 and 128 and a mounting distance L between the two acceleration sensors 127 and 128, using the following expression (1).

$$\alpha = (G1 - G2) \times 9.8/L [\text{rad}/s^2] \quad (1)$$

FIG. 4 is a block diagram of a main part of a magnetic disk device conducting a rotative-disturbance compensation by using outputs of the conventional acceleration sensors.

An output Gn of the acceleration sensor 127 or 128 is filtered through a filter unit 131, and undergoes a gain adjustment in a gain-adjusting unit 132, and then is supplied to a subtracter 133 as a compensation signal Sb. The subtracter 133 is supplied with a control amount signal Sa from a controller 134. A subtracter 135 is supplied with information of an aimed position and information of a positioning error of a controlled object 136 so as to supply differential information therebetween to the controller 134. The controller 134 generates the control amount signal Sa (a tracking error signal) based on the differential information supplied from the subtracter 135. The control amount signal Sa is supplied to the subtracter 133, as mentioned above, in which the compensation signal Sb is subtracted from the control amount signal Sa, giving a driving information S. The driving information S is supplied to a VCM (voice coil motor) that is the controlled object 136.

As described above, the conventional magnetic disk device conducting a disturbance compensation has the acceleration sensor in order to sense disturbing vibrations. Consequently, the conventional magnetic disk device has a complicated structure, and thus becomes costly. Moreover, since an acceleration sensor generally senses only a linear acceleration, the conventional magnetic disk device has to have a plurality of the acceleration sensors 127 and 128 in order to sense a rotational acceleration. This raises the cost of the conventional magnetic disk device much higher.

SUMMARY OF THE INVENTION

It is a general object of the present invention to provide an improved and useful disk device and a method of compensating a disturbance in the disk device.

A more specific object of the present invention is to provide a disk device and a method of compensating a disturbance in the disk device which device can have a simple structure capable of positioning a head accurately.

In order to achieve the above-mentioned objects, there is provided according to one aspect of the present invention a disk device comprising:

a disk having predetermined information sectors recorded at a constant interval;

a head scanning the disk; and a disturbance-compensation unit obtaining an amount of a disturbance based on a time-interval measurement in reading the predetermined information sectors so as to compensate a position of the head according to the amount of the disturbance.

Additionally, in the disk device according to the present invention, the disturbance-compensation unit may compensate a tracking error signal according to the amount of the disturbance, the tracking error signal corresponding to a positional error of the head on the disk.

According to the present invention, the disk device does not need to have an acceleration sensor, and thus can have a simplified structure.

Additionally, in the disk device according to the present invention, the disturbance-compensation unit may include:

an angular-acceleration calculating unit calculating a rotational angular acceleration of a motor based on the time-interval measurement, the motor rotating the disk; and a disturbance-compensation amount calculating unit calculating a disturbance-compensation amount based on the rotational angular acceleration so as to compensate the position of the head according to the disturbance-compensation amount.

According to the present invention, since the rotational angular acceleration can be calculated based on the time-interval measurement in reading the predetermined information sectors, the disk device does not need to have an acceleration sensor, and thus can have a simplified structure.

Additionally, in the disk device according to the present invention, the disturbance-compensation unit may further include a filter filtering a value of the rotational angular acceleration including a vibration of the disturbance so as to supply the value to the disturbance-compensation amount calculating unit.

According to the present invention, only the vibration of the disturbance can be compensated in positioning the head.

Additionally, in the disk device according to the present invention, the disturbance-compensation unit may include:

an angular-velocity calculating unit calculating a rotational angular velocity of a motor based on the time-interval measurement, the motor rotating the disk;

an angular-acceleration calculating unit calculating a rotational angular acceleration of the motor based on the rotational angular velocity; and a disturbance-compensation amount calculating unit calculating a disturbance-compensation amount based on the rotational angular acceleration so as to compensate the position of the head according to the disturbance-compensation amount.

Additionally, in the disk device according to the present invention, the angular-acceleration calculating unit may be composed of a differential filter.

According to the present invention, since the rotational angular acceleration can be calculated based on the time-interval measurement in reading the predetermined information sectors, the disk device does not need to have an acceleration sensor, and thus can have a simplified structure.

Additionally, in the disk device according to the present invention, the disturbance-compensation unit may further include a filter filtering a value of the rotational angular velocity including a vibration of the disturbance so as to supply the value to the angular-acceleration calculating unit.

According to the present invention, only the vibration of the disturbance can be compensated in positioning the head.

Additionally, in the disk device according to the present invention, the disturbance-compensation unit may include a repeatable run-out amount obtaining unit obtaining a repeatable run-out amount of the head in relation to the disk so as to adjust the amount of the disturbance by the repeatable run-out amount.

Additionally, in the disk device according to the present invention, the repeatable run-out amount obtaining unit may obtain the repeatable run-out amount by preliminarily detecting a deviation amount of the head affected by few disturbances, the head deviating from a track of the disk by the deviation amount.

Additionally, in the disk device according to the present invention, the repeatable run-out amount obtaining unit may calculate an average of repeatable run-out amounts of the head measured at a plurality of points on the disk so as to adjust the amount of the disturbance by the average.

Additionally, in the disk device according to the present invention, the repeatable run-out amount obtaining unit may divide the disk into a plurality of zones so as to obtain the repeatable run-out amount in each of the zones.

According to the present invention, since the repeatable run-out amount (originating from an eccentricity of the disk) can be excluded from the amount of the disturbance, the position of the head can be compensated more accurately.

In order to achieve the above-mentioned objects, there is also provided according to another aspect of the present invention a disturbance compensation method for a disk device including a disk having predetermined information sectors recorded at a constant interval, and a head scanning the disk, the method comprising the steps of:

obtaining an amount of a disturbance based on a time-interval measurement in reading the predetermined information sectors; and compensating a position of the head according to the amount of the disturbance.

Additionally, the disturbance compensation method according to the present invention may further comprise the step of compensating a tracking error signal according to the amount of the disturbance, the tracking error signal corresponding to a positional error of the head on the disk.

According to the present invention, the disturbance compensation method does not need to use an acceleration sensor, and instead, uses simplified steps.

Additionally, the disturbance compensation method according to the present invention may further comprise the steps of:

calculating a rotational angular acceleration of a motor based on the time-interval measurement, the motor rotating the disk; and calculating a disturbance-compensation amount based on the rotational angular acceleration so as to compensate the position of the head according to the disturbance-compensation amount.

According to the present invention, since the rotational angular acceleration can be calculated based on the time-interval measurement in reading the predetermined information sectors, the disturbance compensation method does not need to use an acceleration sensor, and thus can have simplified steps.

Additionally, the disturbance compensation method according to the present invention may further comprise the steps of:

calculating a rotational angular velocity of a motor based on the time-interval measurement, the motor rotating the disk;

calculating a rotational angular acceleration of the motor based on the rotational angular velocity; and calculating a disturbance-compensation amount based on the rotational angular acceleration so as to compensate the position of the head according to the disturbance-compensation amount.

According to the present invention, since the rotational angular acceleration can be calculated based on the time-interval measurement in reading the predetermined information sectors, the disturbance compensation method does not need to use an acceleration sensor, and thus can have simplified steps.

Additionally, the disturbance compensation method according to the present invention may further comprise the steps of:

obtaining a repeatable run-out amount of the head in relation to the disk; and adjusting the amount of the disturbance by the repeatable run-out amount.

Additionally, the disturbance compensation method according to the present invention may further comprise the step of preliminarily detecting a deviation amount of the head affected by few disturbances, the head deviating from a track of the disk by the deviation amount, so as to obtain the repeatable run-out amount.

Additionally, the disturbance compensation method according to the present invention may further comprise the step of calculating an average of repeatable run-out amounts of the head measured at a plurality of points on the disk so as to adjust the amount of the disturbance by the average.

Additionally, the disturbance compensation method according to the present invention may further comprise the step of dividing the disk into a plurality of zones so as to obtain the repeatable run-out amount in each of the zones.

According to the present invention, since the repeatable run-out amount (originating from an eccentricity of the disk) can be excluded from the amount of the disturbance, the position of the head can be compensated more accurately.

Other objects, features and advantages of the present invention will become more apparent from the following detailed description when read in conjunction with the accompanying drawings.

BRIEF DESCRIPTION OF THE DRAWINGS

FIG. 10A is a first illustration for explaining operations removing an influence of a repeatable run out;

FIG. 10B is a second illustration for explaining the operations removing the influence of the repeatable run out;

DETAILED DESCRIPTION OF THE PREFERRED EMBODIMENTS

A description will now be given, with reference to the drawings, of an embodiment according to the present invention.

As described hereinafter, the present embodiment conducts a disturbance compensation by measuring a time interval of a servo sector and calculating an amount of a disturbance vibration based on an erroneous amount relative to a reference value of the time interval of the servo sector.

Then, a description will first be given of a disk format of a magnetic disk device.

Figure 5:
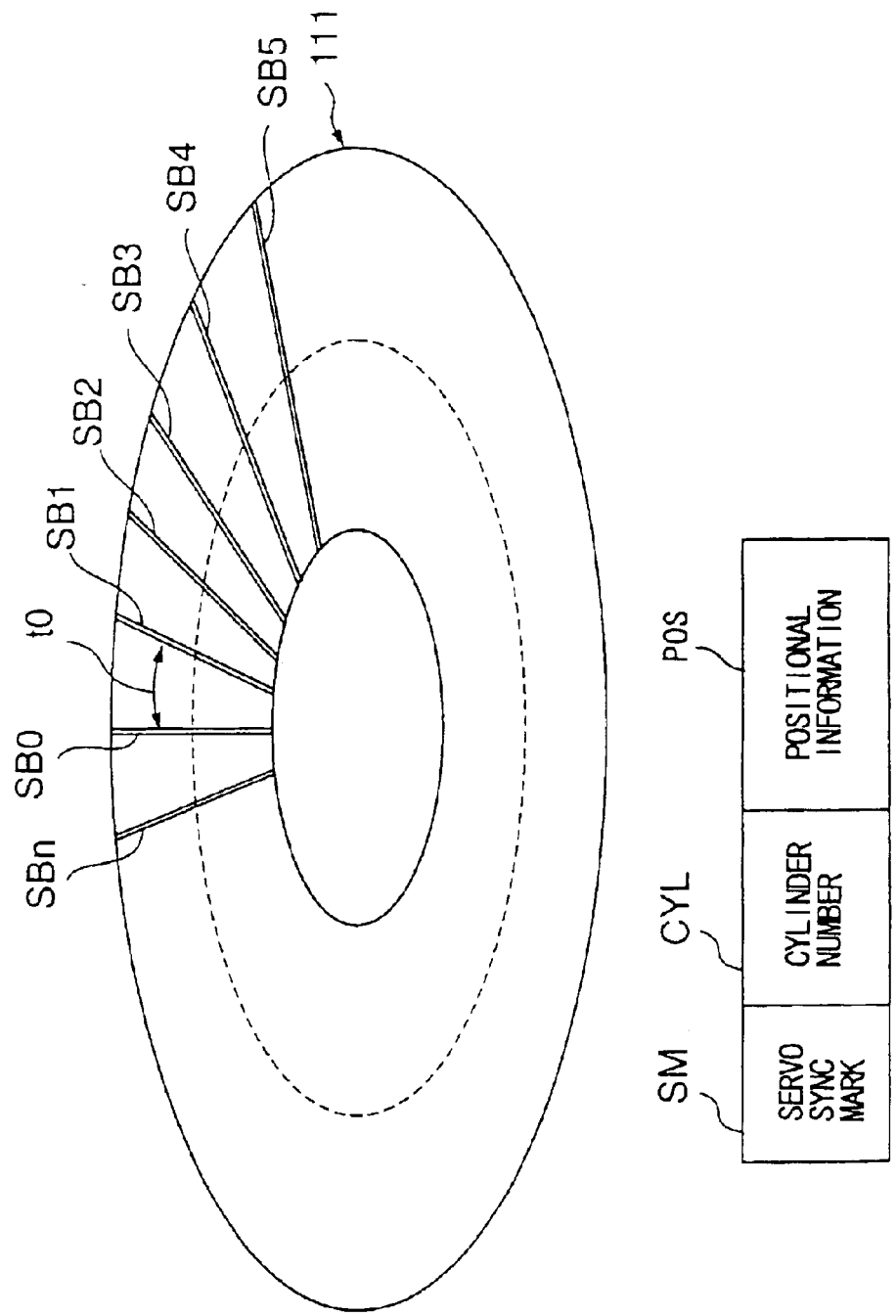
FIG. 5A is an illustration of a disk format.
FIG. 5B is an illustration indicating a layout of a servo sector shown in FIG. 5A.

FIG. 5A is an illustration of a disk format.

The magnetic disk 111 has servo sectors SB0 to SBn formed at a constant servo-sector interval t0. The servo sectors SB0 to SBn are recorded beforehand by a servo track writer (STW). Each of the servo sectors SB0 to SBn includes a servo sync mark SM, a cylinder number CYL, a positional information POS, as shown in FIG. 5B. Each of the servo sectors SB0 to SBn is recognized when the servo sync mark SM is detected. Accordingly, a servo-sector time interval $T_{SB}$ can be detected as an interval from a time when one servo sync mark SM is detected to a time when the next servo sync mark SM is detected.

Generally in the magnetic disk device 100, the spindle motor 112 rotates at a constant speed in a steady-state rotation. Therefore, a rotative variance is 0 in an ideal environment, and thus the servo-sector time interval $T_{SB}$ becomes constant. However, an external vibration or a disturbing vibration caused by a reaction-force of the VCM 115 in seeking imposed on a body of the magnetic disk device 100 affects a relative position of the magnetic head 113 and the magnetic disk 111 so as to fluctuate the actual servo-sector time interval $T_{SB}$.

The present embodiment conducts a disturbance compensation by observing a differential time of the actual servo-sector time interval $T_{SB}$ relative to the ideal servo-sector time interval $T_{SB}$ so as to calculate an amount of a disturbance vibration.

Figure 1:
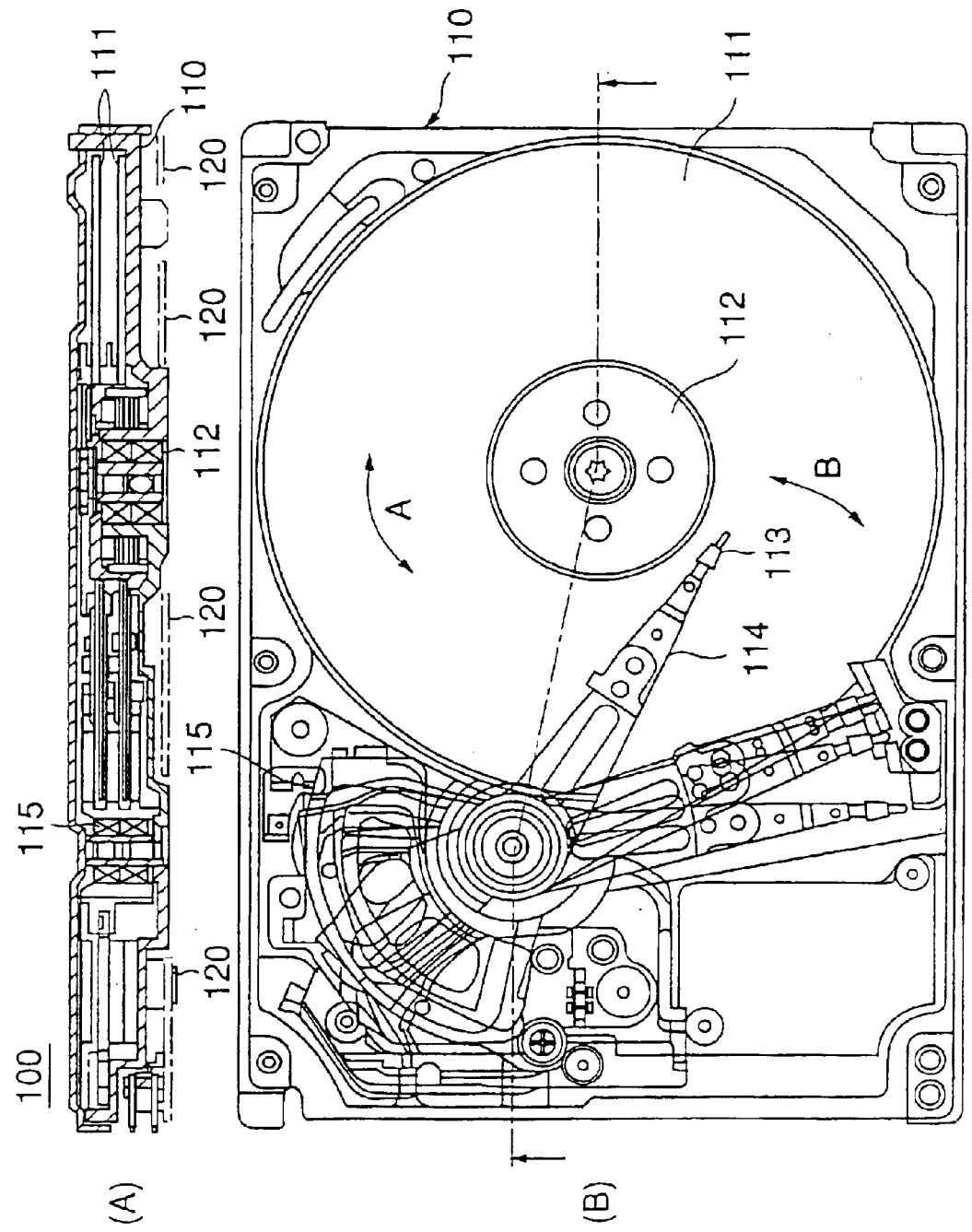
FIG. 1 is an illustration of a structure of a conventional magnetic disk device.
Figure 2:
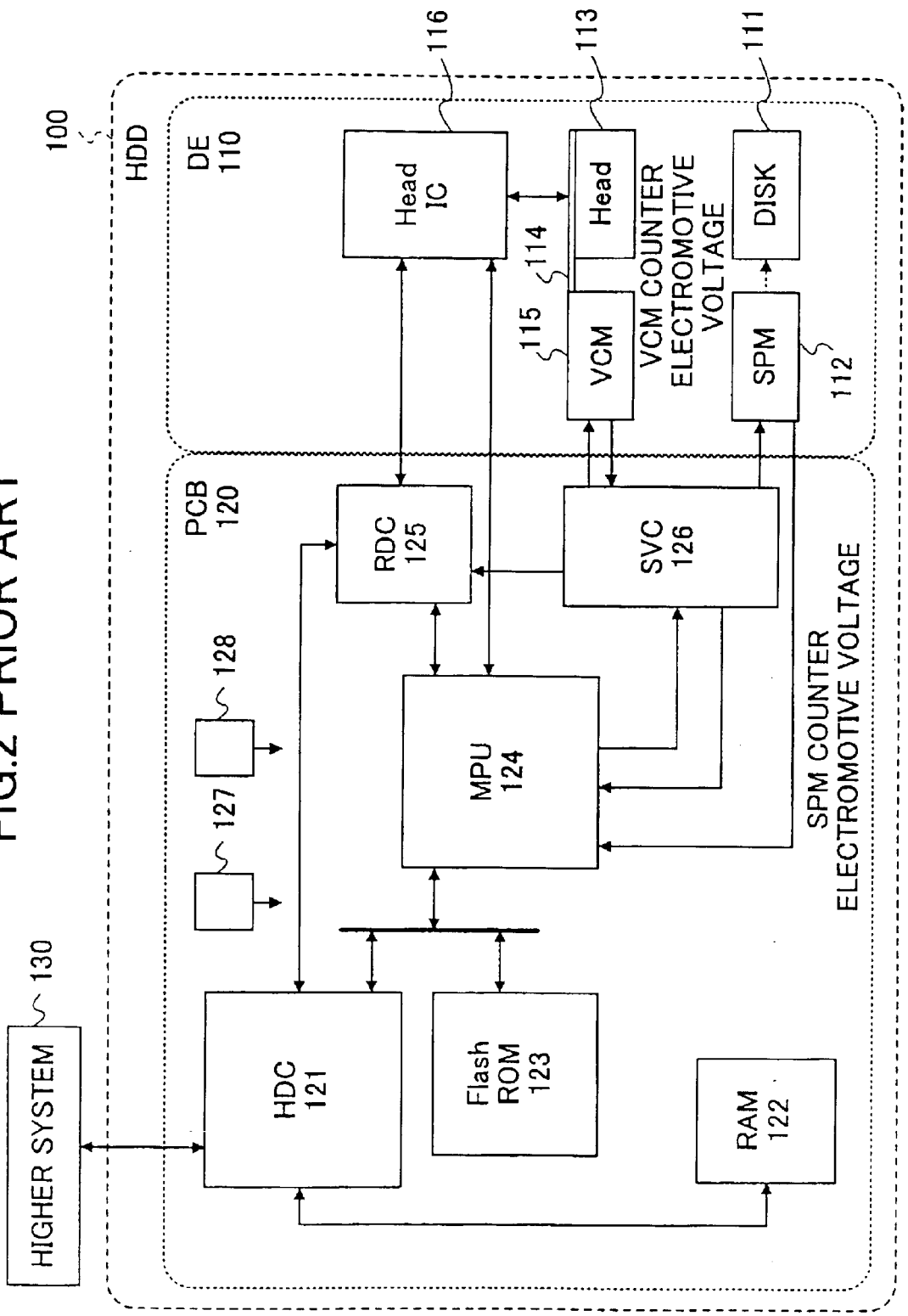
FIG. 2 is a block diagram of the conventional magnetic disk device.
Figure 3:
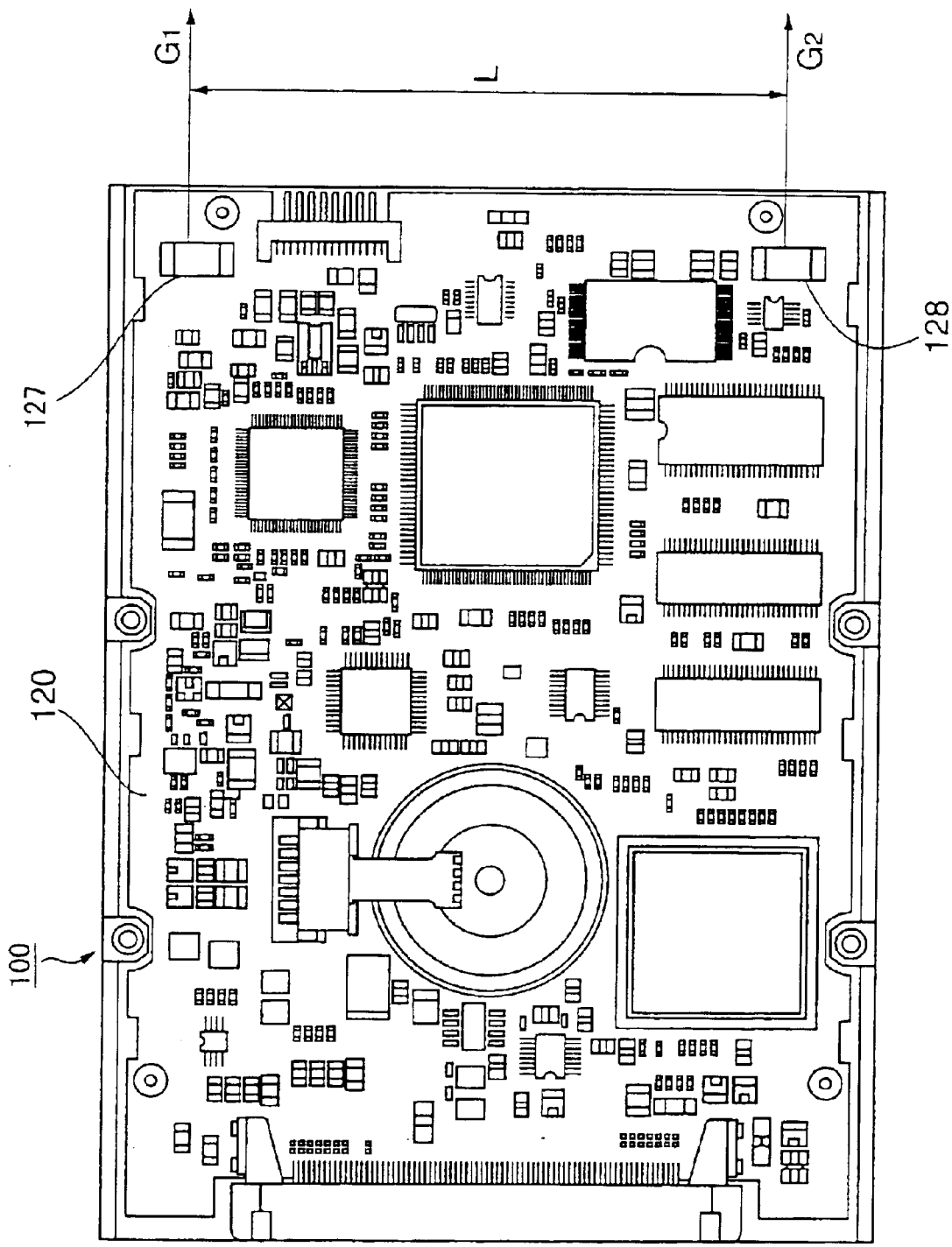
FIG. 3 is a plan view of a conventional printed circuit board.
Figure 4:
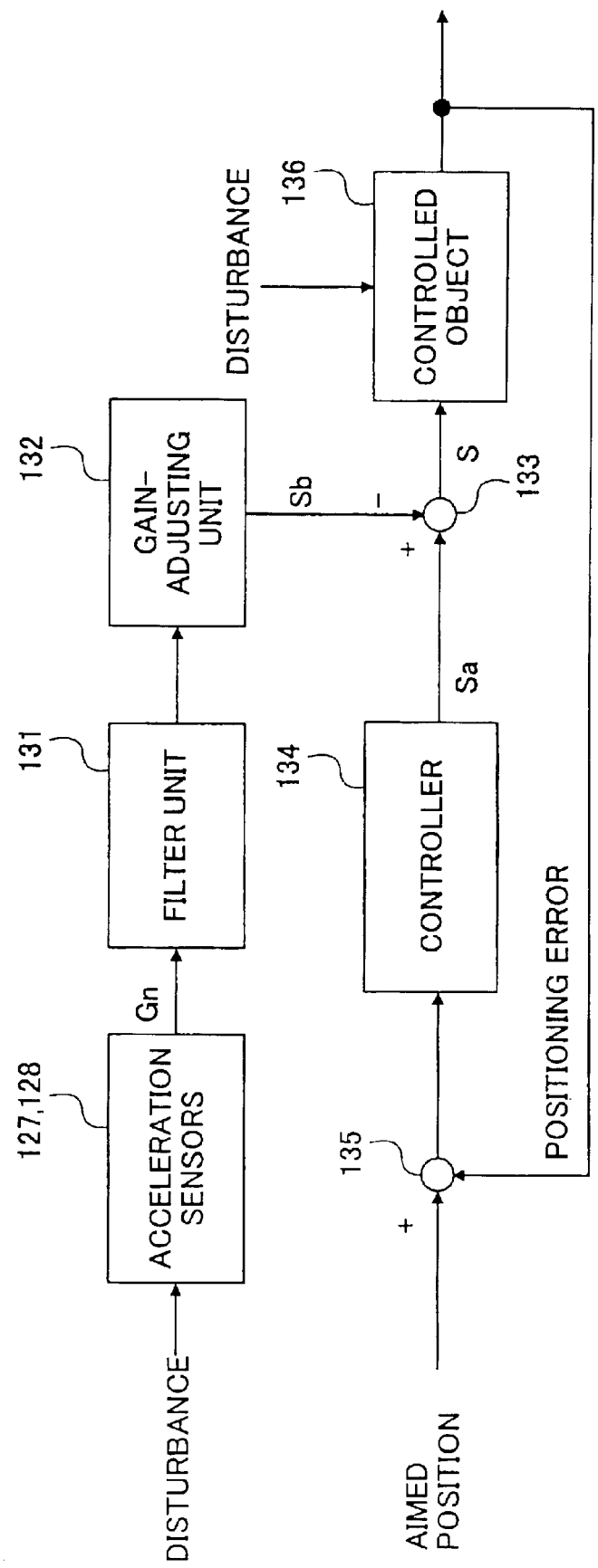
FIG. 4 is a block diagram of a main part of a magnetic disk device conducting a rotative-disturbance compensation by using outputs of conventional acceleration sensors.
Figure 6:
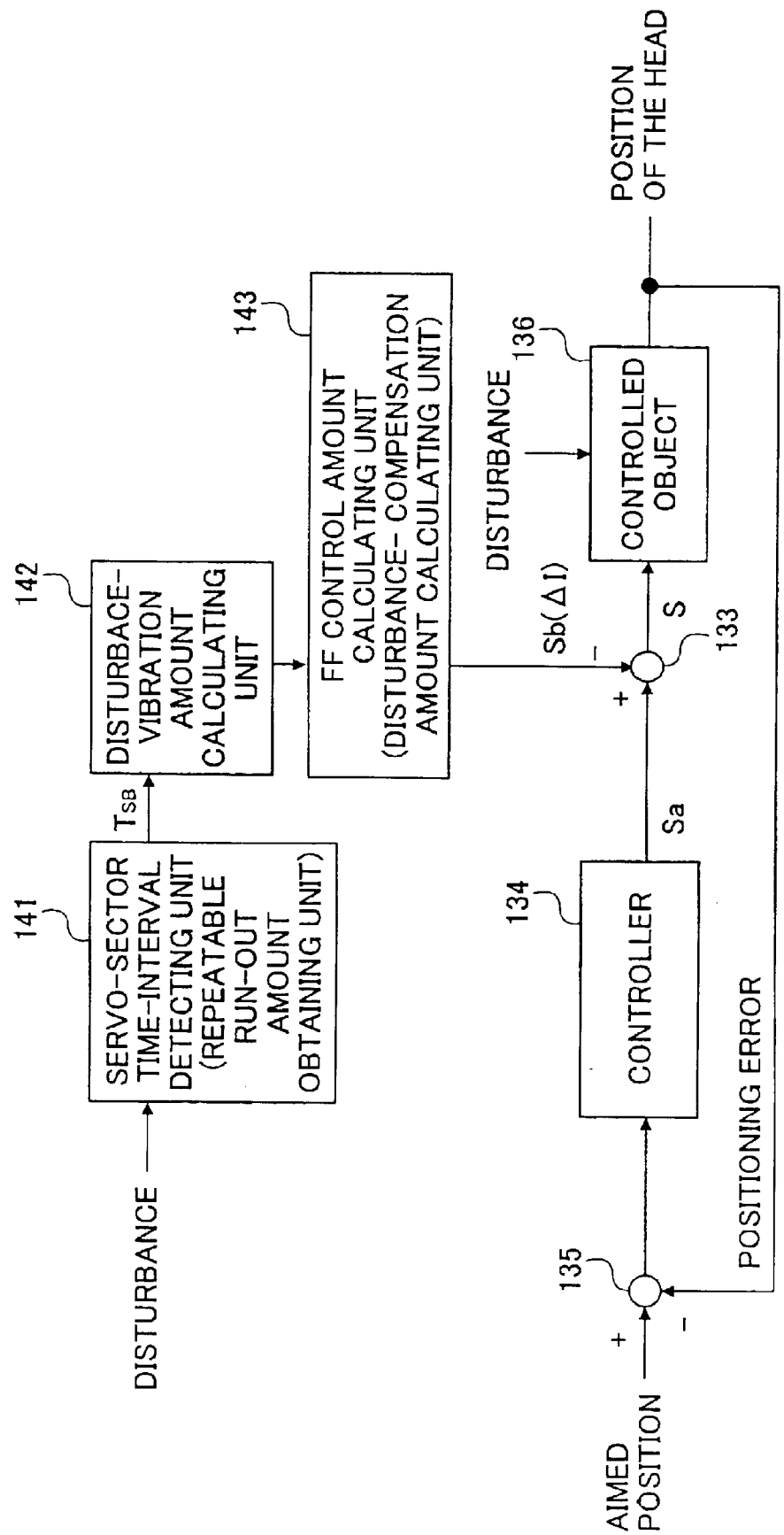
FIG. 6 is a functional block diagram of a disturbance-compensation control according to an embodiment of the present invention.

FIG. 6 is a functional block diagram of a disturbance-compensation control according to the present embodiment. Elements in FIG. 6 that are identical to the elements shown in FIG. 4 are referenced by the same reference marks, and will not be described in detail. It is noted that the disturbance-compensation control shown in FIG. 6 is a function conducted by the MPU 124 shown in FIG. 2.

The functional block diagram of the disturbance-compensation control according to the present embodiment comprises a servo-sector time-interval detecting unit 141, a disturbance-vibration amount calculating unit 142, and a feed-forward (FF) control amount calculating unit (a disturbance-compensation amount calculating unit) 143 in place of the acceleration sensors 127 and 128, the filter unit 131, and the gain-adjusting unit 132. The servo-sector time-interval detecting unit 141, the disturbance-vibration amount calculating unit 142, and the feed-forward control amount calculating unit 143 compose a disturbance-compensation unit conducting the disturbance-compensation control. The servo-sector time-interval detecting unit 141 also functions as a repeatable run-out amount obtaining unit.

The servo-sector time-interval detecting unit 141 detects the servo-sector time interval $T_{SB}$ of the servo sectors SB0 to SBn shown in FIG. 5A. In this course, the servo-sector time interval $T_{SB}$ is adjusted by a time corresponding to a repeatable run-out amount, as described hereinafter with reference to FIG. 11A to FIG. 11C. The servo-sector time interval $T_{SB}$ detected by the servo-sector time-interval detecting unit 141 is supplied to the disturbance-vibration amount calculating unit 142. The disturbance-vibration amount calculating unit 142 calculates an amount of a disturbance vibration from the servo-sector time interval $T_{SB}$.

Figure 7:
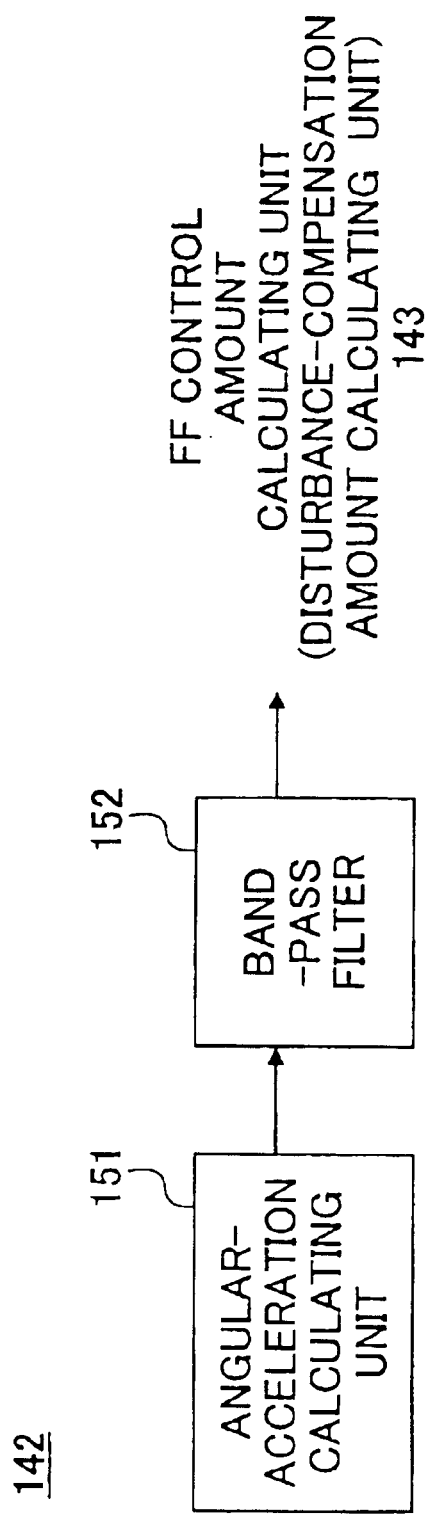
FIG. 7 is a block diagram of a disturbance-vibration amount calculating unit according to the present embodiment.

FIG. 7 is a block diagram of the disturbance-vibration amount calculating unit 142 according to the present embodiment.

The disturbance-vibration amount calculating unit 142 comprises an angular-acceleration calculating unit 151 and a band-pass filter 152. The angular-acceleration calculating unit 151 calculates an angular acceleration by using the following expressions (2) and (3) based on fluctuations of the servo-sector time interval $T_{SB}$ detected by the servo-sector time-interval detecting unit 141.

First, a rotational angular velocity $\omega$ is calculated from the servo-sector time interval. The rotational angular velocity $\omega$ is obtained by the following expression (2), assuming that a reference value of the servo-sector time interval is $T_0$, an actually measured servo-sector time interval is $T_{S1}$, and a reference value of a rotational angular velocity of the spindle motor 112 is $\omega_0$.

$$\omega = \omega_0 \times (T_{S1}/T_0) \quad (2)$$

Next, a rotational angular acceleration $\alpha$ is calculated from the rotational angular velocity $\omega$ obtained by the expression (2).

An rotational angular acceleration $\alpha_n$ at an nth sample is obtained by the following expression (3), assuming that a rotational angular velocity at the nth sample is $\omega_n$, a rotational angular velocity at a sample immediately before the nth sample is $\omega_{n-1}$, and the reference value of the servo-sector time interval is $T_0$.

$$\alpha_n = (\omega_n - \omega_{n-1})/T_0 \quad (3)$$

The angular acceleration $\alpha_n$ calculated by the angular-acceleration calculating unit 151 is supplied the band-pass filter 152. The band-pass filter 152 filters frequencies corresponding to the angular acceleration within a frequency band of the disturbance vibration, and cuts out the other frequencies. Thereby, only the disturbance vibration can be compensated. It is noted that a frequency characteristic of the band-pass filter 152 varies according to each magnetic disk device. An output of the band-pass filter 152 is supplied to the feed-forward control amount calculating unit 143 as the amount of the disturbance vibration calculated in the disturbance-vibration amount calculating unit 142.

It is noted that, although the disturbance-vibration amount calculating unit 142 according to the present embodiment uses the foregoing expression (3) to calculate the rotational angular acceleration $\alpha$, a differential filter can also be used instead of using the foregoing expression (3).

Figure 8:
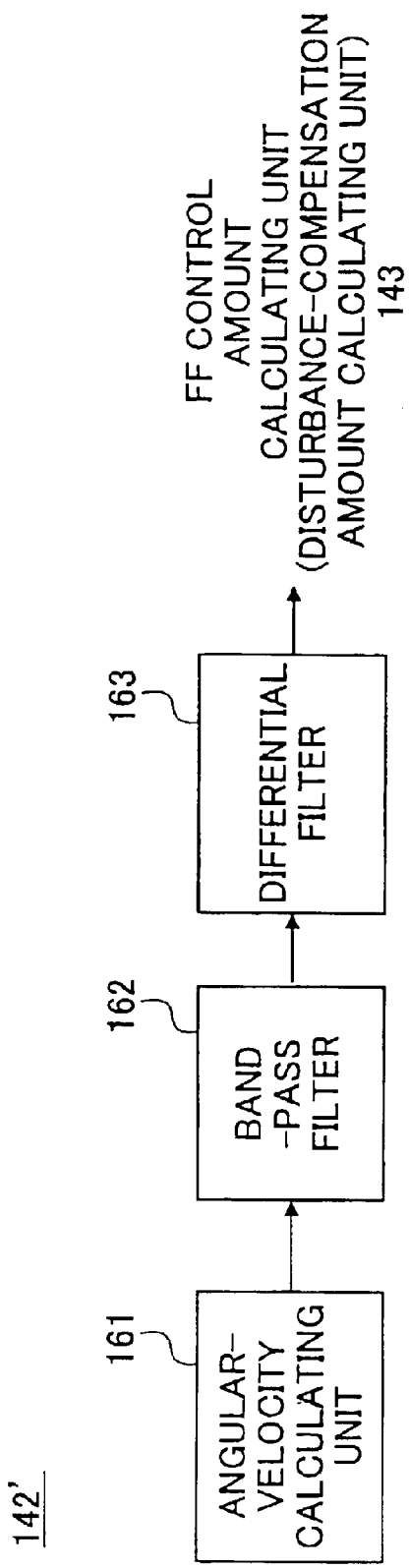
FIG. 8 is a block diagram of a variation of the disturbance-vibration amount calculating unit according to the present embodiment.

FIG. 8 is a block diagram of a variation of the disturbance-vibration amount calculating unit 142 according to the present embodiment.

A disturbance-vibration amount calculating unit 142' comprises an angular-velocity calculating unit 161, a band-pass filter 162 and a differential filter 163.

The angular-velocity calculating unit 161 calculates the rotational angular velocity $\omega$ from the servo-sector time interval by using the foregoing expression (2). The rotational angular velocity $\omega$ calculated by the angular-velocity calculating unit 161 is supplied to the band-pass filter 162. The band-pass filter 162 filters frequencies corresponding to the angular velocity within a frequency band of a disturbance vibration, and cuts out the other frequencies. Thereby, only the disturbance vibration can be compensated. It is noted that a frequency characteristic of the band-pass filter 162 varies according to each magnetic disk device. An output of the band-pass filter 162 is supplied to the differential filter 163. The differential filter 163 differentiates the output of the band-pass filter 162. Since the output of the band-pass filter 162 is the rotational angular velocity $\omega$, differentiating the rotational angular velocity $\omega$ gives the rotational angular acceleration $\alpha$. The rotational angular acceleration $\alpha$ output by the differential filter 163 is supplied to the feed-forward control amount calculating unit 143 as an amount of the disturbance vibration calculated in the disturbance-vibration amount calculating unit 142'.

The amount of the disturbance vibration calculated in the disturbance-vibration amount calculating unit 142 or 142' is supplied to the feed-forward control amount calculating unit 143, as mentioned above. The feed-forward control amount calculating unit 143 calculates a feed-forward control amount (a disturbance-compensation amount) based on the amount of the disturbance vibration.

The feed-forward control amount calculating unit 143 calculates an additional electric-current directive value $\Delta I$ as the feed-forward control amount. The additional electric current directive value $\Delta I$ is calculated from the rotational angular acceleration $\alpha$.

The additional electric-current directive value $\Delta I$ is calculated from the rotational angular acceleration $\alpha_n$ obtained in the disturbance-vibration amount calculating unit 142 or 142' by the following expression (4), assuming that a gain for converting the rotational angular acceleration $\alpha_n$ into an angular acceleration at a position of a head gap of the magnetic head 113 is G, a BL value is BL [N/A], a radius of the head gap is $r_h$ [m], and a reduced mass of the head gap is $m_h$ [kg].

$$\Delta I = G \times \alpha_n \times (m_h \times r_h / BL) \quad (4)$$

The feed-forward control amount calculated by the feed-forward control amount calculating unit 143, i.e., the additional electric-current directive value $\Delta I$ is supplied to the subtracter 133. The subtracter 133 is also supplied with the tracking error signal (the control amount signal Sa) from the controller 134, as mentioned above. The subtracter 133 subtracts the negative value $-\Delta I$ of the additional electric-current directive value $\Delta I$ from the tracking error signal, i.e., adds the additional electric-current directive value $\Delta I$ to the tracking error signal, and supplies the calculation result to the controlled object 136 as the driving information S.

Accordingly, the controlled object 136 (the VCM 115) is controlled by the driving information S which is a tracking error signal reduced by the subtraction of the additional electric-current directive value $\Delta I$, i.e., the influence of the disturbance vibration. Thereby, the VCM 115 can substantially be kept away from the influence of the disturbance vibration.

Next, a description will be given of operations of a program performed by the MPU 124.

Figure 9:
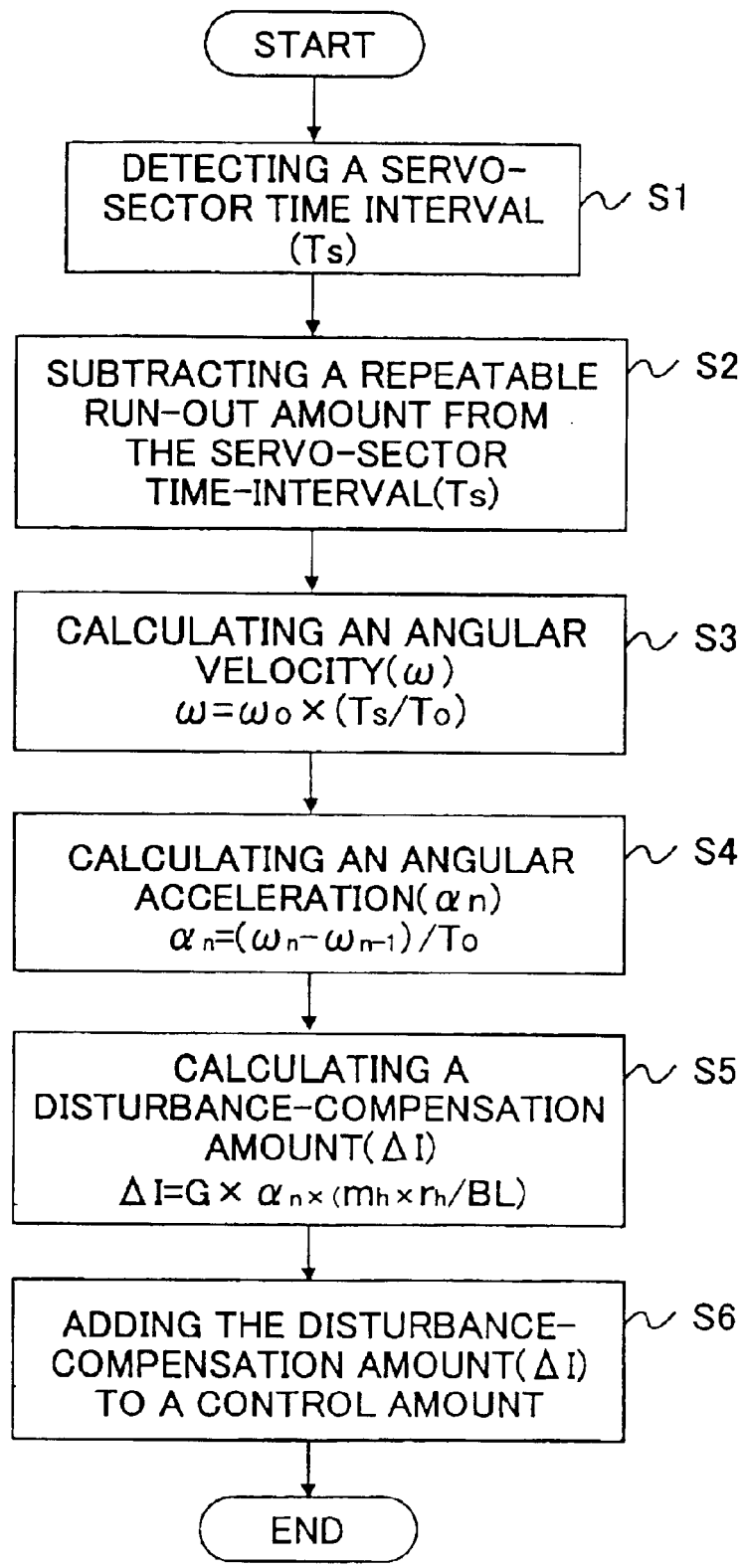
FIG. 9 is a process flowchart of the disturbance-compensation control using a servo-sector time-interval measurement according to the present embodiment.

FIG. 9 is a process flowchart of the disturbance-compensation control using the servo-sector time interval according to the present embodiment. The disturbance-compensation control shown in FIG. 9 is performed by the MPU 124 according to, for example, a program stored beforehand in the ROM 123 shown in FIG. 2.

First, in step S1, a servo-sector time interval $T_{S0}$ between a servo sector sampled at the present time and a servo sector sampled at the previous time is detected.

Next, in step S2, the servo-sector time interval $T_{S1}$ is obtained by subtracting a time corresponding to a repeatable run-out amount including an eccentricity calculated beforehand from the servo-sector time interval $T_{S0}$ detected in step S1. Thereby, a time fluctuation originating from the eccentricity can be omitted from the servo-sector time interval $T_{S1}$.

At this point, a description will be given of the process of omitting the repeatable run out factor. First, an operational principle thereof is described.

FIG. 10A and FIG. 10B are illustrations for explaining operations removing an influence of the repeatable run out. FIG. 10A shows fluctuations of the servo-sector time interval $T_{SB}$ observed while the magnetic disk device 100 is excited by a rotary exciter at a constant frequency as shown in FIG. 10B.

As shown in FIG. 10A and FIG. 10B, the fluctuations of the servo-sector time interval $T_{SB}$ shown in FIG. 10A synchronize with a rotary excitation shown in FIG. 10B. Therefore, a rotative disturbance vibration can be detected by observing the servo-sector time interval $T_{SB}$.

Next, a method of calculating the repeatable run-out amount is described.

Figure 11C:
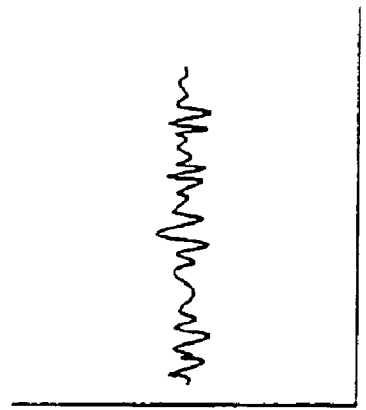
FIG. 11C is a third illustration for explaining the method of calculating the repeatable run-out amount.
Figure 11B:
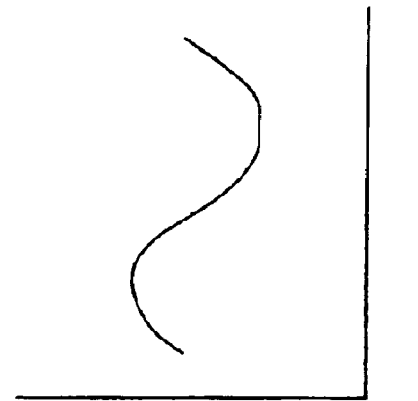
FIG. 11B is a second illustration for explaining the method of calculating the repeatable run-out amount.
Figure 11A:
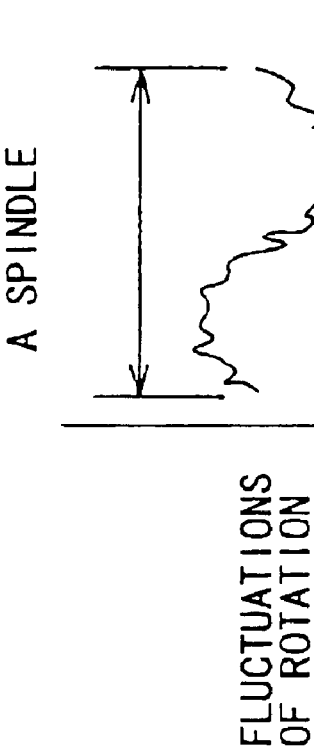
FIG. 11A is a first illustration for explaining a method of calculating a repeatable run-out amount.

FIG. 11A, FIG. 11B and FIG. 11C are illustrations for explaining the method of calculating the repeatable run-out amount. FIG. 11A shows fluctuations of rotation observed in one rotation of the spindle motor 112 affected by disturbances. FIG. 11B shows fluctuations of rotation observed in one rotation of the spindle motor 112 affected by few disturbances. FIG. 11C shows differentials between the fluctuations of rotation shown in FIG. 11A and the fluctuations of rotation shown in FIG. 11B.

Since the fluctuations of rotation shown in FIG. 11B are affected by few disturbances, these fluctuations of rotation shown in FIG. 11B represent an eccentricity (causing the repeatable run-out amount) of the spindle motor 112 and the magnetic disk 111.

Therefore, by observing the fluctuations of rotation (the repeatable run-out amount) shown in FIG. 11B and calculating a differential between every two of the fluctuations of rotation, and then subtracting a time corresponding to the differential between the two sampled servo sectors from the servo-sector time interval $T_{S0}$ detected in step S1, the servo-sector time interval $T_{S1}$ can be obtained without including the eccentricity factor.

Alternatively, the servo-sector time interval $T_{S1}$ without the eccentricity factor can be obtained by observing the fluctuations of rotation (the repeatable run-out amount) shown in FIG. 11B and calculating the average of the fluctuations of rotation beforehand, and then subtracting a time corresponding to the average from the servo-sector time interval $T_{S0}$ detected in step S1.

It is noted that the above-mentioned differential calculation or the averaging calculation to obtain the eccentricity factor may be performed for any cylinder of the magnetic disk 111. Additionally, average data may be used for all cylinders of the magnetic disk 111. Further, all the cylinders may be divided into a plurality of zones so as to obtain the eccentricity of each of the zones to exclude the eccentricity factor.

Then, in step S3, the rotational angular velocity ω is calculated from the servo-sector time interval $T_{S1}$ separated from the eccentricity factor in step S2, by using the foregoing expression (2).

Subsequently, in step S4, the rotational angular acceleration $\alpha_n$ is calculated from the rotational angular velocity ω obtained in step 3, by using the foregoing expression (3).

Then, in step S5, the additional electric-current directive value ΔI is calculated as the feed-forward control amount (the disturbance-compensation amount) from the rotational angular acceleration $\alpha_n$ obtained in step S4, by using the foregoing expression (4).

Finally, in step S6, the additional electric-current directive value ΔI (the disturbance-compensation amount) is added to a control amount.

As described above, the magnetic disk device according to the present embodiment does not need to have an acceleration sensor, and thus becomes less costly.

The present invention is not limited to the specifically disclosed embodiments, and variations and modifications may be made without departing from the scope of the present invention.

The present application is based on Japanese priority application No. 2001-039249 filed on Feb. 15, 2001, the entire contents of which are hereby incorporated by reference.

What is claimed is:

1. A disk device comprising:
   a disk having predetermined information sectors recorded at a constant interval;
   a head scanning said disk; and
   a disturbance-compensation unit obtaining an amount of a disturbance based on a time-interval measurement in reading said predetermined information sectors so as to compensate a position of said head according to the amount of the disturbance.

2. The disk device as claimed in claim 1, wherein said disturbance-compensation unit compensates a tracking error signal according to the amount of the disturbance, the tracking error signal corresponding to a positional error of said head on said disk.

3. The disk device as claimed in claim 1, wherein said disturbance-compensation unit includes:
   an angular-acceleration calculating unit calculating a rotational angular acceleration of a motor based on the time-interval measurement, the motor rotating said disk; and
   a disturbance-compensation amount calculating unit calculating a disturbance-compensation amount based on said rotational angular acceleration so as to compensate the position of said head according to said disturbance-compensation amount.

4. The disk device as claimed in claim 3, wherein said disturbance-compensation unit further includes a filter filtering a value of said rotational angular acceleration including a vibration of the disturbance so as to supply said value to said disturbance-compensation amount calculating unit.

5. The disk device as claimed in claim 1, wherein said disturbance-compensation unit includes:
   an angular-velocity calculating unit calculating a rotational angular velocity of a motor based on the time-interval measurement, the motor rotating said disk;

an angular-acceleration calculating unit calculating a rotational angular acceleration of said motor based on said rotational angular velocity; and a disturbance-compensation amount calculating unit calculating a disturbance-compensation amount based on said rotational angular acceleration so as to compensate the position of said head according to said disturbance-compensation amount.

6. The disk device as claimed in claim 5, wherein said disturbance-compensation unit further includes a filter filtering a value of said rotational angular velocity including a vibration of the disturbance so as to supply said value to said angular-acceleration calculating unit.

7. The disk device as claimed in claim 5, wherein said angular-acceleration calculating unit is composed of a differential filter.

8. The disk device as claimed in claim 1, wherein said disturbance-compensation unit includes a repeatable run-out amount obtaining unit obtaining a repeatable run-out amount of said head in relation to said disk so as to adjust the amount of the disturbance by the repeatable run-out amount.

9. The disk device as claimed in claim 8, wherein said repeatable run-out amount obtaining unit obtains said repeatable run-out amount by preliminarily detecting a deviation amount of said head affected by few disturbances, said head deviating from a track of said disk by the deviation amount.

10. The disk device as claimed in claim 8, wherein said repeatable run-out amount obtaining unit calculates an average of repeatable run-out amounts of said head measured at a plurality of points on said disk so as to adjust the amount of the disturbance by said average.

11. The disk device as claimed in claim 8, wherein said repeatable run-out amount obtaining unit divides said disk into a plurality of zones so as to obtain the repeatable run-out amount in each of said zones.

12. A disturbance compensation method for a disk device including a disk having predetermined information sectors recorded at a constant interval, and a head scanning said disk, the method comprising the steps of:

obtaining an amount of a disturbance based on a time-interval measurement in reading said predetermined information sectors; and compensating a position of said head according to the amount of the disturbance.

13. The disturbance compensation method as claimed in claim 12, further comprising the step of compensating a tracking error signal according to the amount of the disturbance, the tracking error signal corresponding to a positional error of said head on said disk.

14. The disturbance compensation method as claimed in claim 12, further comprising the steps of:

calculating a rotational angular acceleration of a motor based on the time-interval measurement, the motor rotating said disk; and calculating a disturbance-compensation amount based on said rotational angular acceleration so as to compensate the position of said head according to said disturbance-compensation amount.

15. The disturbance compensation method as claimed in claim 12, further comprising the steps of:

calculating a rotational angular velocity of a motor based on the time-interval measurement, the motor rotating said disk;

calculating a rotational angular acceleration of said motor based on said rotational angular velocity; and calculating a disturbance-compensation amount based on said rotational angular acceleration so as to compensate the position of said head according to said disturbance-compensation amount.

16. The disturbance compensation method as claimed in claim 12, further comprising the steps of:

obtaining a repeatable run-out amount of said head in relation to said disk; and adjusting the amount of the disturbance by the repeatable run-out amount.

17. The disturbance compensation method as claimed in claim 16, further comprising the step of preliminarily detecting a deviation amount of said head affected by few disturbances, said head deviating from a track of said disk by the deviation amount, so as to obtain said repeatable run-out amount.

18. The disturbance compensation method as claimed in claim 16, further comprising the step of calculating an average of repeatable run-out amounts of said head measured at a plurality of points on said disk so as to adjust the amount of the disturbance by said average.

19. The disturbance compensation method as claimed in claim 16, further comprising the step of dividing said disk into a plurality of zones so as to obtain the repeatable run-out amount in each of said zones.

20. A disk device operable with a disk that is prerecorded with predetermined information at constant intervals, comprising:

a head configured to read information from the disk; and a compensation unit configured to obtain an amount of disturbance based on time intervals of the predetermined information read by said head, and to compensate a position of said head based on the obtained amount of disturbance.

* * * * *